Dec. 6, 1938.   F. S. MARCELLUS   2,139,508

AIR JET RECORDER

Filed June 17, 1936

Inventor:
Fredrick S. Marcellus,
by Harry E. Dunham
His Attorney

Patented Dec. 6, 1938

2,139,508

UNITED STATES PATENT OFFICE 2,139,508

AIR JET RECORDER

Fredrick S. Marcellus, Scotia, N. Y., assignor to General Electric Company, a corporation of New York

Application June 17, 1936, Serial No. 85,723

1 Claim. (Cl. 234—70)

My invention relates to recording instruments and devices and has for its primary object the provision of sturdy, reliable apparatus for producing a clear and legible record although placing only a relatively very light load on the moving element of the deflecting instrument or device used in connection with the recording apparatus. Other and further objects and advantages will become apparent as the description proceeds.

In accordance with the invention in its preferred form, a sheet of suitable material forming a record chart is passed at any desired speed under an air or vapor jet serving as a marking stylus. However, instead of supplying marking material from the air jet, a marking member having a surface coated with a suitable marking material is placed in close proximity to the under surface of the record chart under the air jet and the surface of the marking member is caused to travel at an appreciable velocity with respect to the record sheet. The air jet serving as a stylus blows the portion of the sheet under it against the marking material, which is deposited upon the record sheet by abrasion and without placing any appreciable load upon the movable arm carrying the air jet. Owing to the relatively high velocity of the surface of the marking member, ample material may be deposited for producing a legible record.

Figure 1:
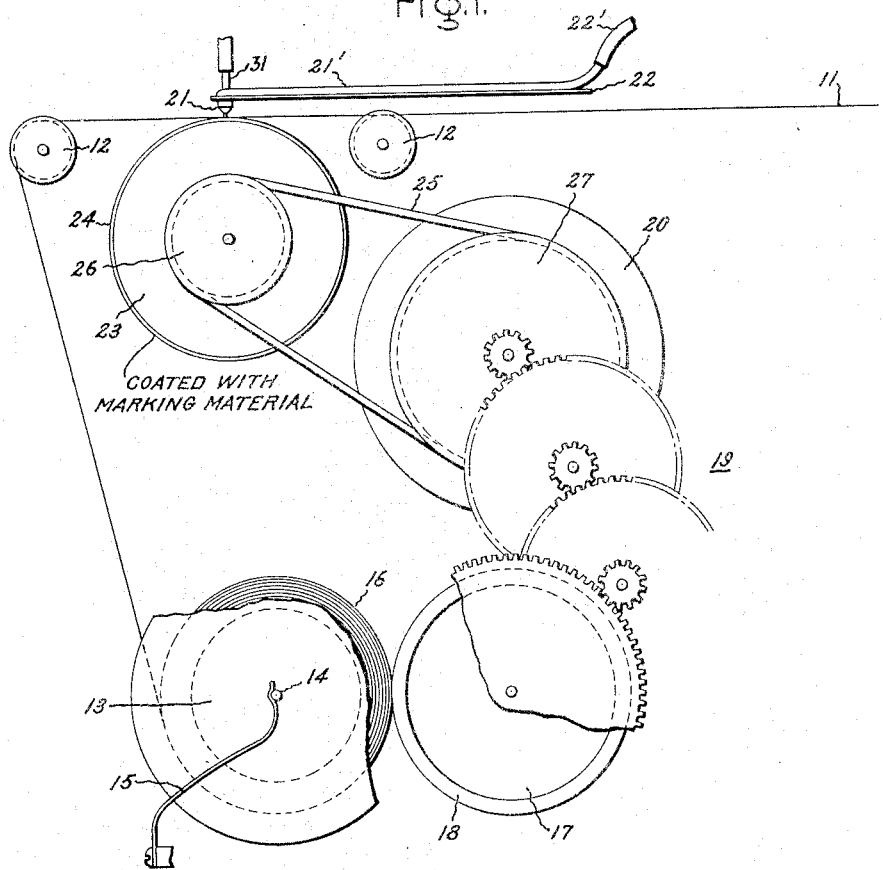
Figure 2:
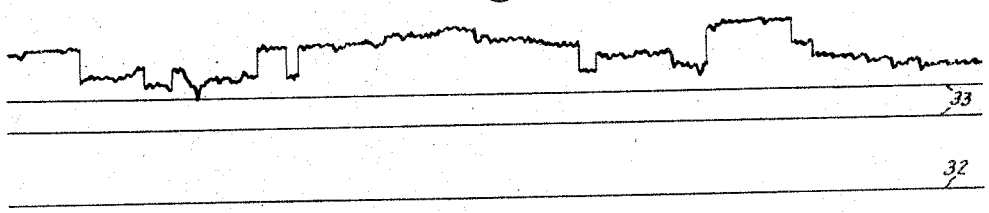

The invention may be understood more readily from the following detailed description when considered in connection with the accompanying drawing and the features of the invention which are believed to be novel and patentable will be pointed out in the claim appended hereto. In the drawing, Fig. 1 represents in schematic form an end elevation including the essential elements forming an embodiment of my invention, and Fig. 2 is a reproduction of a sample record curve produced by the apparatus of Fig. 1 and illustrating its adaptability in representing rapid fluctuations and minute deviations in the value of a measured quantity.

Referring now more in detail to the drawing, a record chart or sheet 11 in the form of a strip is represented coming from a supply roll, not shown, and passing over guide rolls 12 to a reroll spool 13. The record sheet 11 is preferably, but not necessarily, transparent or translucent. Although I prefer to utilize a record chart in the form of a strip passing from a supply spool to a reroll spool, it will be understood that my invention is not limited to this specific construction and that it may be applied to any apparatus in which a chart in sheet form may be employed, whether the chart is arranged for longitudinal or circular travel. The reroll spool 13 is provided with a shaft 14, the projecting ends of which engage leaf springs 15 which serve to hold the reroll spool 13 against a driving roll 17. The surface 16 of the record strip rolled upon the spool 13 engages the surface of a soft rubber face 18 of the drive roll 17. The drive roll 17 is driven through a train of gears 19 by means of a constant speed motor 20, for example, a clockwork motor or a synchronous electric motor.

A fine air nozzle 21 adapted to direct a fine stream of air or other suitable gas including a vapor vertically against the sheet 11 is carried on the end of a transverse movable arm 22. The nozzle 21 is supplied with air through a tube 21' which may be carried by the movable arm 22 or may, itself, constitute a portion of the movable arm 22. A soft rubber flexible air hose 22' connected to a source of compressed air or other gas, not shown, is provided for furnishing the gas to the tube 21'. The movable arm 22 is carried by the movable element of an indicating instrument or is connected to the movable element of any other apparatus, the motion of which is to be recorded. Since such apparatus forms no part of the present invention, I have indicated the movable element by showing only a portion of the movable arm 22. It will be understood that, in the case of deflecting instruments, the flexible air hose 22' is preferably supported near the pivot axis of the arm 22 in order to prevent the air hose 22' from offering any resistance to deflection of the arm 22. A marking cylinder 23 is mounted below the record strip 11 with its surface 24 in close proximity to the strip, so that the air jet or the fine stream of air issuing from the nozzle 21 impinges against the record strip 11, causing the portion thereof under the tip of the air nozzle 21 to be wiped by the marking surface 23.

Although I have referred to a movable air nozzle, it will be understood that marking would take place in the same manner if the nozzle were fixed in position. Obviously, my invention embraces also apparatus having a plurality of fixed or movable air nozzles for any desired purpose. For example, one or more stationary air nozzles 31 may be used for producing a base line 32 or division lines 33, thereby making unnecessary the use of ruled record sheets or, if desired, one or more marking points or styli, such as described in Patent No. 2,044,586 granted June 16, 1936, on my copending application, Serial No. 656,131, filed February 10, 1933, and assigned to the same assignee as the present application, may be utilized in conjunction with the air nozzle 21.

The marking member 24 may be of any suitable construction, for example, it may be composed of a substantially solid cylinder of graphite, and its surface may comprise any suitable material, for example, the graphite at the surface of such a cylinder. I have found that a sheet of carbon paper 24 wrapped around a plain cylinder may satisfactorily be employed. The marking cylinder 23 is driven at a constant speed by means of a constant-speed motor to which the cylinder 23 is connected by means of a belt 25 carried by pulleys 26 and 27 attached to the marking cylinder 23 and the shaft of the motor 20, respectively. Satisfactory results have been obtained by causing the surface of the marking cylinder 23 to travel in the same direction as the record sheet 11 but at a greater velocity. It will be understood, however, that, if desired, the surface of the cylinder 23 may be caused to travel in the reverse direction at a velocity greater or less than the velocity of the sheet 11. It will be apparent that, where it is desired to insure ample legibility of the record curve produced, such legibility may be enhanced by increasing the velocity of the surface of the marking cylinder 23, thus increasing the amount of material deposited.

Since the motor 20 operates at a constant speed the surface of the soft rubber face 18 of the driving roll 17 will travel at a constant speed. The surface of the soft rubber face 18 engages the surface of the outer layer of the record strip wound on the reroll spool 13 and drives the record strip 11 at constant speed, also thereby providing suitable timing of the record strip.

It will be observed from the drawing that the surface of the marking cylinder 23 is arranged to drive at a relatively higher velocity than the record strip 11 although I am not limited to any given range of velocities. I have found, for example, that suitable results may be obtained by giving the marking roll 23 a peripheral speed of about ten inches per minute.

Although the air stream from the nozzle 21 may bear only lightly against the record strip 11, owing to the relative motion between the marking surface 23 and the under surface of the record strip 11, sufficient material is deposited upon the record strip 11 to form a clear record. The action is analogous to passing a pencil across a sheet of paper very lightly a large number of times instead of only a single time with greater pressure.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

In apparatus for producing linear markings on a traveling sheet having a marking member supported on one side of a traveling sheet, a nozzle mounted in proximity to the marking member for directing a stream of gas against said sheet and pressing the portion of the sheet impinged by said gas stream lightly against the surface of the marking member.

FREDRICK S. MARCELLUS.